United States Patent [19]

Bridger et al.

[11] Patent Number: 5,248,401
[45] Date of Patent: Sep. 28, 1993

[54] ELECTRODES

[75] Inventors: Nevill J. Bridger, Hermitage; Christopher P. Jones, Swindon; Andrew D. Turner, Abingdon; Pauline E. Ransford, Ipswich, all of United Kingdom

[73] Assignee: United Kingdom Atomic Energy Authority, London, United Kingdom

[21] Appl. No.: 706,253

[22] Filed: May 28, 1991

[30] Foreign Application Priority Data

May 26, 1990 [GB] United Kingdom ............... 9012187

[51] Int. Cl.$^5$ ............................................ B01D 63/00
[52] U.S. Cl. ................................. 204/290 R; 204/291; 204/282
[58] Field of Search ................ 204/282, 283, 290 R, 204/291

[56] References Cited

U.S. PATENT DOCUMENTS

| | | | |
|---|---|---|---|
| 4,224,121 | 9/1980 | Dempsey et al. | 204/98 |
| 4,546,010 | 10/1985 | Killer et al. | 427/96 |
| 4,569,739 | 2/1986 | Klinkowski | 204/180.1 |

FOREIGN PATENT DOCUMENTS

| | | |
|---|---|---|
| 64838A | 11/1982 | European Pat. Off. |
| 1220456 | 1/1971 | United Kingdom . |
| 1247732 | 9/1971 | United Kingdom . |
| 2064586 | 6/1981 | United Kingdom . |
| 2073252A | 10/1981 | United Kingdom . |
| 2113251A | 8/1983 | United Kingdom . |
| 2150598B | 12/1987 | United Kingdom . |
| 2150597B | 6/1988 | United Kingdom . |
| 2198427A | 6/1988 | United Kingdom . |

OTHER PUBLICATIONS

*Chem. Abs.* 1982: 190 408 n (=JP-A-8289490-Asahi).

*Primary Examiner*—John Niebling
*Assistant Examiner*—Arun S. Phasge
*Attorney, Agent, or Firm*—Larson and Taylor

[57] ABSTRACT

An electrode for use in electrochemical ion exchange comprises an electrically conducting element covered by at least two layers of ion exchange material. The material in one layer differs in its electrical, chemical, or ion exchange properties from that in an adjacent layer. For example a thin layer of cation exchange material underneath a thicker layer of anion exchange material may be used to inhibit the oxidation of chloride ions; a thin layer of cation exchange material covering a thicker layer of anion exchange material provides an anion-responsive electrode with enhanced selectivity for particular ions. An ion-selective anion-responsive electrode can also comprise a thin outer layer of a very weak base anion-responsive material, covering a thicker layer of a strong base material of lower electrical resistivity.

10 Claims, No Drawings

ELECTRODES

This invention relates to electrodes for use in electrochemical ion exchange.

The electrochemical removal of ions from aqueous solutions onto ion-exchange materials, sometimes referred to as electrochemical deionization, is known for example from UK patents GB 1 247 732 and GB 2 150 598. It involves establishing an electrochemical cell comprising the aqueous solution as electrolyte, a working electrode, and a counter electrode, where at least the working electrode incorporates an ion exchange material such as a resin, and applying a d.c. voltage between the electrodes. Subsequent reversal of the voltage enables the absorbed ions to be eluted, so the working electrode can be regenerated without addition of chemical components.

A working electrode may comprise a conducting component, for example platinised titanium mesh, coated with an intimate mixture of an ion exchange material in particulate form and a binder such as an adhesive elastomer. A conducting material such as graphite may be included in the mixture. In the case of an electrode for removing cations from solution the ion exchange material typically incorporates weakly acidic groups, such as carboxylate, and this electrode would be made negative. Not only are cations therefore attracted by this electrode, but hydroxide ions are created by electrolysis near the conducting component which react with the weak acid groups to activate the ion exchange material (represented as XH). The cations $M^+$ are therefore absorbed by the electrode:

$$2 H_2O + 2e \rightarrow H_2 + 2 OH^-$$

$$XH + OH^- \rightarrow H_2O + X^-$$

$$X^- + M^+ \rightarrow XM$$

If the voltage is then reversed, hydrogen ions are generated near the conducting component, which displace the cations; the cations can therefore be eluted.

In an electrode for removing anions from solution the ion exchange material typically incorporates basic groups such as amines, and this electrode would be made positive. Anions are therefore attracted to it, and furthermore water is electrolysed near the conducting component to create hydrogen ions. This leads to activation of the ion-exchange material (represented as XN), and consequent absorption of the anions $A^-$ $$2 H_2O \rightarrow O_2 + 4H^+ + 4e$$

$$XN + H^+ \rightarrow XNH^+$$

$$XNH^+ + A^- \rightarrow XNHA$$

Subsequent reversal of the applied voltage leads to creation of hydroxide ions by electrolysis, with consequent elution of the anions:

$$XNHA + OH^- \rightarrow XN + H_2O + A^-$$

It will be appreciated that an electrochemical ion exchange cell might comprise a cation-responsive electrode with a counter electrode, or an anion-responsive electrode with a counter electrode, or a cation-responsive electrode with an anion-responsive electrode.

Electrodes incorporating a conducting mesh at a surface of a polymer membrane are known from GB 2 073 252A, for use as a permionic cell separator between an anolyte and a catholyte. The membrane has ion-exchange properties, and in one embodiment it comprises two layers. Each layer is of a single-phase polymer (either a solid or a gel), the thick layer between 10 and 1000 microns thick, and the thin layer less than 10 microns thick.

It has been found in practice that a variety of problems arise with electrochemical ion exchange electrodes as described above. For example an ion exchange material (such as zirconium phosphate, $Zr(HPO_4)_2$) may become hydrolysed during use; where the solution contains chloride ions these may become oxidised at the anode to chlorine, which can lead to degradation of the ion exchange material; where different ions are present in the solution it may be desirable that one ion is absorbed more effectively than another; an ion exchange material with suitable ion exchange properties may be found to create an excessive electrical resistance.

According to the present invention there is provided an electrode for use in electrochemical ion exchange comprising an electrically conducting element covered by at least two successive layers, each layer comprising an ion exchange material, the ion exchange material in at least one layer being in particulate form. The ion exchange material in one layer preferably differs in its electrical, chemical, or ion exchange properties from that in the adjacent layer.

Preferably the outermost layer completely covers the external surfaces of the electrode which are to be exposed to the solution, so the solution is directly exposed to only one ion exchange material.. Typically each layer comprises an intimate mixture of the ion exchange material in particulate form and a binder. Preferably the ion exchange material particle size is in the range 10-200 $\mu$m and most preferably between 40-100 $\mu$m. Each layer, of course, must be water-permeable to permit electrolysis at the electrical conductor.

The invention will now be further and more particularly described, by way of example only, and with reference to the following Examples.

1. PROTECTIVE COATING

If an aqueous solution containing chloride ions is treated by electrochemical ion exchange, the voltages applied are such that at an anode chloride ions may be oxidised to chlorine. This reacts with water (rapidly if in alkaline solution) to form hypochlorite. Higher oxidation states of chlorine can also be produced electrochemically. These chlorine compounds can degrade anion exchange resins by reacting with the amine groups.

In order to inhibit the production of oxy-anions of chlorine, a thin coating of a strong acid cation exchange resin can be put onto the anode. This coating is impermeable to anions since the negatively charged groups within the resin matrix repel anions electrostatically. This repulsion is analogous to Donnan exclusion. Experiments have been carried out coating metal electrodes with such a resin by dipping into a mixture of resin in particulate form, binder (a solution of kraton 18% in genklene), and genklene in equal proportions. The coated electrodes have been used to electrolyse an aqueous solution containing chloride ions, and the resins Dowex 50 and CG 120 have been found to suppress the oxidation of chloride ions (compared to an uncoated electrode) by a factor of over 200 times. Such a coating is desirably applied to the counter-electrode in an electrochemical anion-exchange cell, so that chloride ions are not oxidised during the elution process (when the counter-electrode is the anode).

EXAMPLE 1

An anion-responsive electrode suitable for use in aqueous solutions containing chloride ions, comprises a platinised titanium mesh coated as described above with a thin layer of Dowex 50 resin in particulate form with a binder, about 1 mm thick, covered by a thicker layer of IRA 94 S anion-exchange resin in particulate form with a binder.

2. HYDROLYSIS SUPPRESSION

Zirconium phosphate ($Zr(HPO_4)_2$) has been found suitable for use as a cation-exchange material in electrochemical ion exchange. During operation as a cation absorber the water in the immediate vicinity of the current conducting component becomes strongly alkaline, and this can lead to hydrolysis of the zirconium phosphate.

EXAMPLE 2

A cation-responsive electrode comprises a platinised titanium mesh coated with a layer of hydrous zirconium oxide in particulate form with a binder, covered by a thicker layer of zirconium phosphate in particulate form with a binder. The hydrous zirconium oxide can act as a cation absorber at high pH, or as an anion absorber at low pH, and is substantially non-hydrolysable. It reduces the pH to which the zirconium phosphate is exposed and so suppresses its hydrolysis.

3. SELECTIVITY

For a given single anion, an equilibrium exists between the ion in solution and that absorbed by the exchanger:

$$A + R \rightleftharpoons A\,R$$ 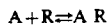

where A is the anion, R the ionised resin and A R the anion/resin complex. The affinity of a specific resin for a specific anion depends upon a number of properties of the anion, for example (1) charge of the anion; (2) hydrated ionic radius; and (3) acid/base behaviour of the anion. The affinity will also depend on certain properties of the resin, for example: (1) acid/base behaviour of active site; (2) structure of resin; and (3) nature of active site (complexation characteristics).

Enhanced affinity for a specific ion results from an increase in the basic behaviour of the active group. Therefore a strong base resin, in which the active group is normally a quaternary ammonium ion, will absorb anions more rapidly than a weak base resin where the active group is, for example, a tertiary ammonium ion. The basicity of the active group can also be varied by altering the position of the amino group within the resin matrix, for example nuclear amino groups are less basic than side chain amino groups. Strong base resins will therefore absorb most anions although the kinetics will vary according to the properties of the anion, for example those listed above. The absorption kinetics for a weak base resin will be slower. This will exaggerate differences in the rate of absorption between anions and will thus enhance the selective removal of anionic species for a mixture of anions.

For the selective removal by electrochemical ion exchange of chloride and sulphate from a solution containing borate, sulphate and chloride, it is possible to define a selectivity coefficient for the absorption process as:

$$K = \frac{[\text{borate}]}{[R\ \text{borate}]} \left[ \frac{[R\ \text{chloride}] + [R\ \text{sulphate}]}{[\text{chloride}] + [\text{sulphate}]} \right]$$

Table 1 gives two examples of selectivity coefficients obtained for electrodes respectively made with a weak base resin (IRA94S) and a very weak base resin (IRA60) in a solution, pH5, containing 1250ppm borate, 5 ppm chloride and 5 ppm sulphate.

TABLE 1

| resin | K |
|---|---|
| IRA94S | 243 |
| IRA60 | 394 |

The value shown for IRA 60 corresponds to percentages of borate, chloride and sulphate removed of 1.7, 85 and 89 respectively. Since the borate concentration is approximately 800 times that of the chloride, this represents excellent selectivity of chloride and sulphate removal over borate.

By using a strong base resin, IRN78L, it is possible to remove not only the chloride and sulphate but also the borate from the above solution. It is thus possible to make an anion-responsive electrode with high or low selectivity as desired, by choosing an appropriate resin.

However it has been found, in using the anion-exchange resin IRA60 in an electrode, that a high operating voltage, above 50V, is required owing to its electrical resistivity. This is due to phase separation between the binder and the resin during manufacture, resulting in a layer of more or less pure binder which acts as an insulator. The problem can be overcome by fabricating the electrode from a resin/binder mixture to which a surfactant has been added. Before use of the electrode the surfactant can be removed by rinsing in water. This produces a more homogeneous electrode structure with a significantly reduced resistance.

EXAMPLE 3

An alternative anion-responsive electrode with high selectivity comprises a platinised titanium mesh coated with a thick layer (e.g. 3 mm thick) of a mixture of IRN 78L resin in particulate form and a binder, coated with a thin layer of a mixture of IRA 60 resin in particulate form and a binder. A surfactant may be included in the mixture when the outer coating is applied, as mentioned above. The resulting electrode has high selectivity due to the very weak base resin IRA 60, yet the electrical resistance, being due principally to the layer of the strong base resin IRN 78L, is low.

EXAMPLE 4

Another anion-responsive electrode with high selectivity comprises a platinised titanium mesh coated with a thick layer (e.g. 4 mm) of a mixture of a strong base anion-responsive resin IRN 78L in particulate form and a binder, covered with a thin layer (e.g. 0.2 mm) of a mixture of a strong acid cation-exchange resin in particulate form, such as CG 120, and a binder. As discussed above in relation to protective coatings, such a layer of cation-exchange resin inhibits the transfer of anions through it. The degree of inhibition increases with (1)

the thickness of the layer, (2) increasing acid nature of the ion exchange groups, and (3) increasing charge/hydrated ionic radius ratio. Consequently the electrode has enhanced selectivity for, for example, nitrate over sulphate ions.

EXAMPLE 5

A cation-responsive electrode with high selectivity comprises a platinised titanium mesh coated with a thick layer (e.g. 4 mm) of a mixture of cation-responsive acid resin IRC 84 in particulate form and a binder, covered with a thin layer (e.g. 0.2 mm) of a mixture of a strong base resin IRN 78L in particulate form and a binder. In an analogous manner to that described in the previous Example, the thin layer of strong base resin inhibits the transfer of cations through it. Consequently the electrode has enhanced selectivity for sodium ions, for example, in comparison to magnesium ions.

It will be appreciated that electrodes of the invention may differ from those described in the above Examples. For example an electrode might comprise more than two layers of different ion-exchange materials; the thicknesses of the several layers may of course differ from the values given in the Examples, and indeed the overall thickness of ion-exchange material may differ on the opposite sides of a flat electrode.

We claim

1. An electrode for use in electrochemical ion exchange comprising an electrically conducting element covered by at least two successive layers, each layer being water-permeable and comprising an ion exchange material, the ion exchange material in at least one layer being in particulate form.

2. An electrode as claimed in claim 1 wherein the ion exchange material in one layer differs in its electrical, chemical, or ion-exchange properties from that in the adjacent layer.

3. An electrode as claimed in claim 2, wherein the outermost layer of ion-exchange material completely covers at least the external surface of the electrode which in use is exposed to a liquid undergoing treatment.

4. An electrode as claimed in claim 2, wherein a first layer comprising a strong-acid cation exchange material is covered by a second layer comprising an anion exchange material.

5. An electrode as claimed in claim 2, wherein a first layer comprising hydrous zirconium oxide is covered by a second layer comprising zirconium phosphate.

6. An electrode as claimed in claim 2, wherein a first layer comprising a base ion-exchange material is covered by a second layer comprising a very weak base ion-exchange material.

7. An electrode as claimed in claim 6 wherein the first layer comprises a strong base ion-exchange material.

8. An electrode as claimed in claim 2 wherein a first layer comprising a strong base ion-exchange material is covered by a second layer comprising a strong acid ion-exchange material.

9. An electrode as claimed in claim 2 wherein a first layer comprising a cationic responsive acid material is covered by a second layer comprising a strong base ion-exchange material.

10. An electrode as claimed in claim 1 wherein the first layer is of different thickness to the second layer.

* * * * *